United States Patent [19]
McCulloch

[11] Patent Number: 4,785,665
[45] Date of Patent: Nov. 22, 1988

[54] MEASURING INSTRUMENT THAT SENSES HEAT TRANSFER ALONG A PROBE

[76] Inventor: Reg W. McCulloch, 321 W. Heritage Dr., Farragut, Tenn. 37922

[21] Appl. No.: 4,325

[22] Filed: Jan. 16, 1987

[51] Int. Cl.[4] ............... G01F 23/22; G01N 25/00
[52] U.S. Cl. ................................. 73/295; 374/43; 374/45
[58] Field of Search ............ 73/295, 304 R; 374/29, 374/164, 165, 43, 45; 219/505; 338/23, 24

[56] References Cited

U.S. PATENT DOCUMENTS

| | | | |
|---|---|---|---|
| 2,702,476 | 2/1955 | De Boisblanc | 73/295 |
| 2,861,159 | 11/1953 | Seney | 201/63 |
| 3,111,031 | 11/1963 | Kurotza | 73/295 |
| 3,216,248 | 11/1965 | Halloway | 374/40 |
| 3,280,627 | 10/1966 | Cousins et al. | 73/295 |
| 3,301,055 | 1/1967 | Williams et al. | 73/295 |
| 3,302,458 | 2/1967 | Scadron | 73/295 |
| 3,308,665 | 3/1967 | Williams | 73/295 |
| 3,360,990 | 1/1968 | Greene et al. | 73/295 |
| 3,701,138 | 10/1972 | Pulliam et al. | 340/244 R |
| 3,921,450 | 11/1975 | Pfister | 73/295 |
| 3,964,311 | 6/1976 | Holmen | 73/295 |
| 4,319,233 | 3/1982 | Matsuoka et al. | 340/622 |
| 4,356,728 | 11/1982 | Gomez | 73/295 |
| 4,361,037 | 11/1982 | Hauschild et al. | 73/295 |
| 4,423,629 | 1/1984 | Ara | 73/295 |
| 4,439,396 | 3/1984 | Rolstad | 376/247 |
| 4,449,403 | 5/1984 | McQueen | 73/295 |
| 4,532,799 | 8/1985 | O'Neill | 73/295 |
| 4,583,401 | 4/1986 | Schlindwein | 73/295 |
| 4,590,797 | 5/1986 | Beaubatie et al. | 73/295 |
| 4,603,580 | 8/1986 | Waring | 73/295 |

*Primary Examiner*—Daniel M. Yasich
*Attorney, Agent, or Firm*—Luedeka, Hodges & Neely

[57] ABSTRACT

A measuring instrument includes a U-shaped probe that senses temperature and is useful for sensing the level of a liquid in a tank. A main probe unit has first and second legs disposed in a side-by-side, parallel relationship and a heater cable is contained within and along the length of the first leg. Heated sensors are disposed inside the first leg in positions proximate to the heater cable for sensing temperatures at a plurality of positions along the first leg, and non-heated sensors are disposed in the second leg for sensing temperatures at a plurality of positions along the second leg. An electrical circuit is connected to the heated temperature sensors and the non-heated temperature sensors for producing at least one signal indicating the temperatures of the heated sensors and preferably indicating the temperatures of the heated sensors relative to the non-heated sensors.

15 Claims, 4 Drawing Sheets

MEASURING INSTRUMENT THAT SENSES HEAT TRANSFER ALONG A PROBE

FIELD OF THE INVENTION

The present invention relates to a measuring instrument that senses temperature and particularly relates to an instrument having a U-shaped probe with sensors that are disposed as temperature references to compensate for changes in environmental temperatures.

BACKGROUND OF THE INVENTION

Probe instruments for sensing temperatures are used in liquid level detectors in which the level of the liquid in a tank is sensed by the probe. The probe is inserted into a tank and it is internally heated. When liquid covers the probe, heat transfer from the probe to the liquid cools the covered portion of the probe. Sensors in the probe determine which part of the probe is hot, and which is cold, and thus determine the level of the liquid. These probes and associated circuitry are basically detecting the heat transfer out of the probe which is a function of the level of the liquid in the tank. However, this type of probe could be used in other applications in which other conditions of the probe environment would affect the heat transfer. For example, such probe would be useful in equipment that detects a fluid flow profile across a fluid stream.

Numerous measuring instruments with probes have been developed for level detectors and related applications using a variety of structural configurations. One popular configuration uses a wire having a series of thermocouple junctions spirally wound about a rod extending vertically in a tank. One purpose of the spiral winding is to produce closely spaced thermocouple junctions in a vertical direction, and another purpose is to physically separate every other thermocouple junction. This separation is accomplished by arranging the spiral and the spacing between the junctions so that every junction is on an opposite side of the rod from its two adjacent junctions. Thus, two rows of thermocouple junctions are formed along opposite sides of the rod, and every other thermocouple junction may be heated by a linear heater cable disposed adjacent to one row of the junctions.

This type of spiral wound structure is inherently difficult to produce because the spiral requires precise spacing and positioning of the thermocouple junctions. The thermocouple junctions must be precisely spaced in the wire prior to being spirally wound about the rod and the spiral winding must be done with care so that the junctions will line up on the rod. If the spiral is too tight or too loose, the junctions will drift out of line. If the wire containing the thermocouple junctions is drawn after the junctions are formed therein, the drawing process must be precise to obtain the desired spacing along the wire between the junctions. The necessity of spirally winding the wire also requires that the thermocouple junction wire and its insulation or other protective coverings be flexible enough to bend around the rod. The spiral also introduces a vertical stagger between heated and non-heated junctions that may require either structural or electrical correction depending upon the application. When the cost of producing such spirally wound probe is held down, the trade-off is a loss of accuracy caused by the inherent difficulties in manufacturing this type of probe.

SUMMARY OF INVENTION

The preferred form of the present invention uses a U-shaped probe configuration and related circuitry to overcome the problems associated with other probe structures. In accordance with one form of the invention the instrument includes a main probe unit having first and second legs disposed in a side-by-side parallel relationship. A heater circuit has a heater cable for heating the first leg of the main probe unit, and heated sensor means are disposed inside the first leg proximate to the heater cable for sensing temperatures at a plurality of positions along the first leg. Second sensor means are disposed in the second leg of the main probe unit for sensing temperatures at a plurality of positions along the second leg and a circuit is connected to the heated sensor means and the second sensor means for producing a signal indicating at least the temperatures along the first leg. In the preferred embodiment, the circuit produces a signal that is proportional to the temperatures along the first leg relative to the temperatures along the second leg.

As used herein, the terms "heated" and "non-heated" are used for purposes of identification and do not necessarily imply that the "heated" and "non-heated" sensor means are different. In the case of a heated sensor, the term "heated" indicates that the sensor is proximate to a source of heat and will be heated thereby under certain circumstances. However, when the probe is inserted into a liquid and the liquid rises to the level of the heated sensor, the liquid will provide a heat sink so that the temperature of the heated sensor will fall. Likewise, the term "non-heated" indicates that a sensor is remotely disposed with respect to a source of heat.

The main probe body is preferably a tube configured into a U-shape. The U-shape has first and second parallel upright sections and has a transverse section connecting the bottom ends of the two upright sections. The two upright sections form the first and second legs mentioned above.

In accordance with one aspect of the present invention, the heated sensor means include at least first and second heated thermocouple junctions disposed at different positions along the length of the first leg, and the non-heated sensor means include at least first and second non-heated thermocouple junctions disposed in the second legs in positions perpendicularly across from the first and second heated thermocouple junctions, respectively. The circuit is connected to the heated and non-heated thermocouple junctions to produce a signal indicating the temperatures of the first and second heated junctions relative to the temperatures of the first and second non-heated junctions, respectively. Thus, the first non-heated thermocouple junction provides a temperature reference for the fist heated thermocouple junction so that the circuit automatically corrects for environmental temperatures. Likewise, the second non-heated thermocouple junction provides temperature compensation for the signal derived from the temperature of the second thermocouple junction.

In accordance with another aspect of the present invention, the heated sensor means is an elongate heated resistor having a resistance that varies with the temperature of the heated resistor. The non-heated sensor means is an elongate non-heated resistor that is identical to the heated resistor, and the non-heated resistor is positioned in the second leg perpendicularly across from the heated resistor in the first leg. The circuit is connected to the heated and non-heated resistors to produce a signal indicating the resistance (and hence the temperature profile) of the heated resistor relative to the non-heated resistor. For example, if liquid in a tank rose to the cover one-half of the length of the probe, and consequently one-half of the lengths of the heated and non-heated resistors, then the liquid would cool the lower portion of the heated resistor and its resistance would drop accordingly. The circuit would produce a signal indicating this resistance change which is also an indication of the temperature profile of the resistor and the level of the liquid.

Other variations of the instrument and the method for constructing the probe are disclosed in the following Detailed Description. The present invention may best be understood by reference to the Detailed Description of preferred embodiments when considered in conjunction with the Drawings in which.

DETAILED DESCRIPTION

Figure 1:
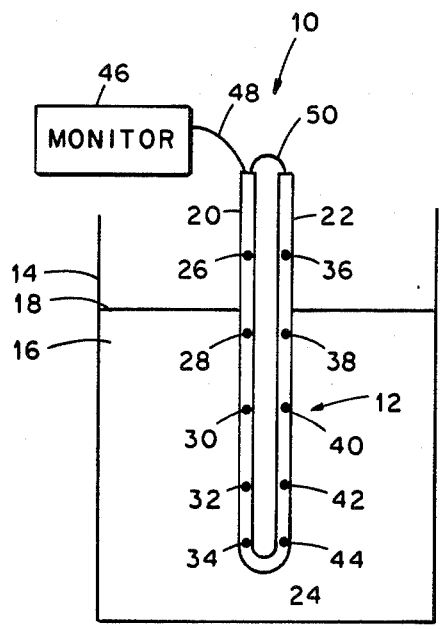
FIG. 1 is a somewhat diagrammatical perspective view of a measuring instrument and probe for sensing temperature and, thus, heat transfer along the probe.

Referring now to the drawings in which like reference characters designate like or corresponding parts throughout the several views, there is shown in FIG. 1 a somewhat diagrammatical view of an electrical monitoring instrument 10 that includes a probe 12 positioned within a container 14 holding a liquid 16. The liquid 16 within the container 14 is filled to a level 18 and the function of the instrument 10 is to sense this liquid level 18. The probe 12 has an elongate U-shaped configuration formed by a first leg 20, a second leg 22 and a connecting segment 24 that connects the bottom ends of the two legs 20 and 22. Heated sensors 26, 28, 30, 32 and 34 are disposed within th first leg 20, and non-heated sensors 36, 38, 40, 42 and 44 are disposed within the second leg 22. The terms "heated" and "non-heated" are not meant to imply that the sensors 20-44 are different in kind or type, but these terms are used to indicate the proximity of sensors to a heat source.

A monitor 46 is connected to the sensors 26-44 by electrical connections 48 and 50 to produce a signal or signals indicating the temperatures of the sensors 26-44. The monitor 46 may comprise analog to digital converters and a computer to monitor the sensors 26-44, or it may be as simple as a power supply and a voltmeter. In one embodiment, the monitor 46 produces a single signal having an amplitude indicating the temperatures of the sensors 26-44 and, thus, indicating the liquid level 18. In the preferred embodiment, the sensors 36-44 in the second leg 22 of the probe 12 constitute reference sensors for the sensors 26-34 in the first leg 20 of the probe 12. Each sensor 36-44 in the second leg 22 is a reference sensor for the particular sensor in the first leg 20 that is perpendicularly across from it. Sensors 26 and 36 are corresponding sensors which means that sensor 36 is a reference sensor for sensor 26. Likewise, sensors 28 and 38, sensors 30 and 40, sensors 32 and 42, and sensors 34 and 44 are corresponding sensors.

Figure 2:
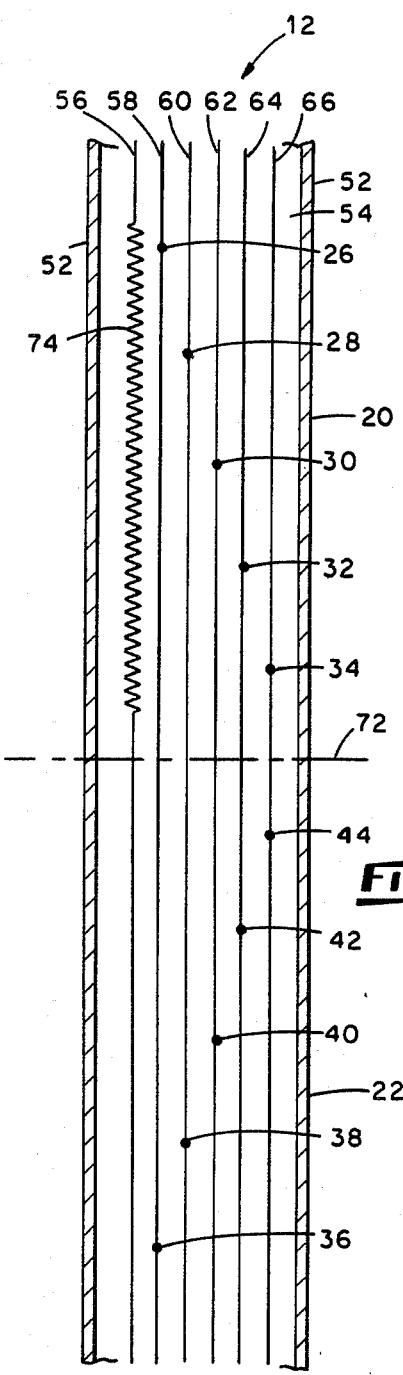
FIG. 2 is a diagrammatical view of a straight sheath with sensor wires disposed within the sheath.

The construction of the probe 12 and the circuitry thereof may be better understood by reference to FIG. 2 which is a diagrammatical view of the probe 12 under construction. A straight tubular metallic sheath 52, preferably constructed of stainless steel, and a straight cylindrical electrical insulator 54, preferably alumina, are used to construct the probe 12. The probe 12 also includes a heater circuit 56 and five sensor wires, 58, 60, 62, 64 and 66. The sensor wires 58-66 shown in FIG. 2 are shown diagrammatically and do not correspond to the actual physical positions of the wires 56-66. The actual physical positioning of these wires is shwn in FIG. 3. In this view, it will be appreciated that the sheath 52 and the insulator 54 are cylindrical in shape. A passageway 68 is formed in the center and extends the length of the insulator 54. This central passageway 68 is dimensioned to contain the heater circuit 56. A plurality of sensor passageways 70 are also formed in the insulator 54 extending through the length thereof. The passageways 70 are equidistantly spaced from the passageway 68 and are equidistantly spaced from adjacent passageways 70 around the approximate perimeter of the insulator 54. The sensor wires 58-66 are disposed within the passageways 70 and, thus, are equidistantly spaced from the heater circuit 56. Although this structure is preferred it is understood that the heater circuit 56 need not be positioned in the center passageway 68 and the sensor wires are not required to be equidistantly spaced from the heater circuit 56 for many applications.

Figure 3:
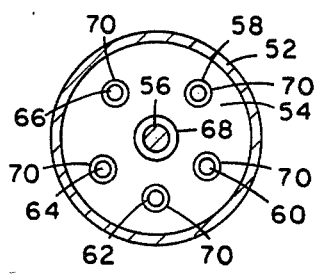
FIG. 3 is a cross-sectional view of one leg of the probe.

Referring to FIGS. 2 and 3, the construction of the probe 12 may be understood. The first step of construction is to insert the heater circuit 56 and the sensor wires 58-66 into the insulator 54 in the positions previously described. Next, the insulator 54 is inserted into the stainless steel sheath 52, and the sheath and insulator are reduced in diameter (such as by swaging) to compress the probe 12 radially inwardly. This swaging crushes the alumina of the insulator 54 so that there is little or no spacing between the sheath 52 and the insulator 54 or between the insulator 54 and the wires 58-66 and circuit 56. The spacing as shown in FIG. 3 is primarily for purposes of clarity and does not indicate that the final probe will have spacing between the wires 58-66 and the passages 70 or between passage 68 and circuit 56. After the initial swaging, the sheath 52 is preferably annealled and swaged again. The annealing and swaging steps are continued until the diameter of the sheath 52 is reduced by a factor of about twenty-five percent. After the steps of swaging, annealing, and drawing are completed, the sheath 52 is again annealled in the area of its midregion indicated by line 72 in FIG. 2 and is formed or bent into a "U" about the midregion line 72 to form the U-shaped probe that is shown in FIG. 1.

Referring to FIG. 2, it is shown that the heater circuit 56 includes a heater cable segment 74 that is disposed only above the midregion line 72. When the sheath 52 is bent into the U-shape, the upper half of the sheath 52 forms the first leg 20 of the probe 12, and the lower half of the sheath 52 forms the second leg 22.

The heated sensors 26–34 and the non-heated sensors 36–44 are positioned in the sheath 52 so that when it is bent around its midregion line 72, the heated and non-heated sensors will be aligned perpendicularly across, one from the other, as shown in FIG. 1. Thus, when the sensor wires 58–66 are inserted into the insulator 54, they are positioned such that the two sensors on each wire are equidistantly spaced from the midregion line 72. Thus, sensors 26 and 36, 28 and 38, 30 and 40, 32 and 42, and 34 and 44 are equidistantly spaced from midregion line 72.

Figure 4:
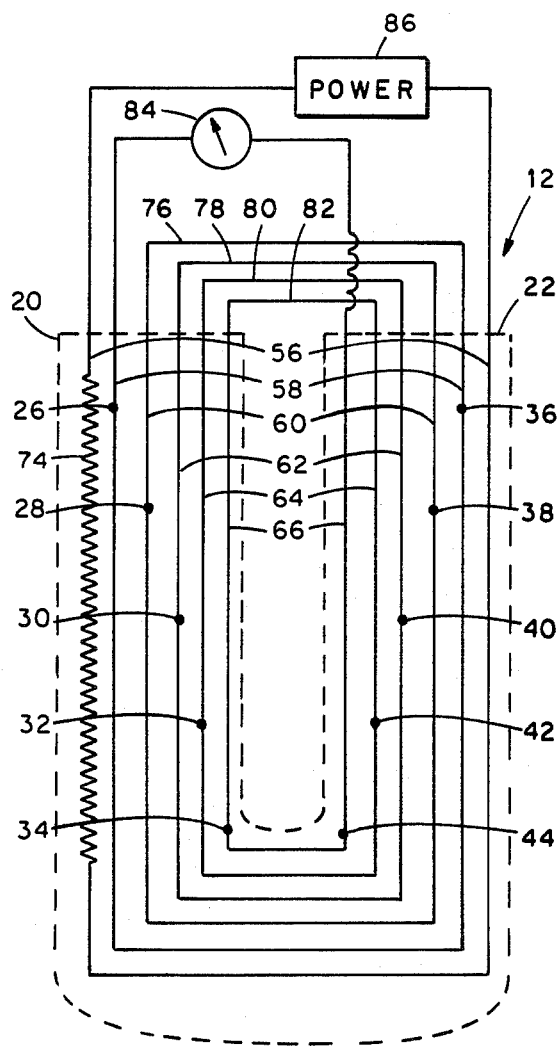
FIGS. 4 and 4a are circuit diagrams of embodiments of the instruments using thermocouple junctions for sensing heat transfer and providing environmental temperature compensation.

Referring now to FIG. 4, a circuit diagram is shown of probe 12 in a preferred configuration. In FIG. 4, the sensor wires 56–64 are connected in series by electrical connections 76, 78, 80 and 82 that extend from the top of the first leg 20 to the top of the first leg 22. Connector 76 is connected from the trailing end of wire 58 which is located in the second leg 22 to the leading end of wire 60 which is positioned in the first leg 20. Likewise, the trailing end of wire 60 is connected to the leading end of wire 62 by connector 78; the trailing end of wire 62 is connected to the leading end of wire 64 by connector 80; and the trailing end of wire 64 is conneced to the leading end of wire 66 by connector 82. The leading end of wire 58 and the trailing end of wire 66 are connected to a volt meter 84, and a power source 86, preferably a constant current source, is connected across wire 56, which has very small changes in resistance with temperature.

In this construction, the sensor wires 58–66 are connected in series so that the voltage appearing on the meter 84 is the sum of the voltages produced by each of the sensor wires 58–66. In this embodiment, the sensors 26–44 are thermocouple junctions formed by constructing the wires alternately of alumel and chromel or other suitable thermoelectric materials. Those portions of the wires 58–66 that are above the thermocouple junctions 26–44 are constructed of alumel, and those portions that are below the thermocouple junctions 26–44 are constructed of chromel. Thus, it will be appreciated that the voltage potential produced by the thermocouple pairs 26 and 36, 28 and 38, 30 and 40, 32 and 42, and 34 and 44 are additive and the junctions 26–34 in leg 20 are opposite in polarity to the junctions 36–44 in leg 22. Since the reference junctions 36–44 are at the same vertical level as the heated junctions 26–34, the reference junctions 36–44 will provide a correction factor or a temperature reference for environmental temperatures. If the temperature of the environment of the entire probe 12 should rise, for example, this rise in temperature would affect the first leg 20 and the second leg 22 equally. The effect on junctions 26–34 would the be the same as the effect on junctions 36–44. Thus, the relative temperature difference appearing at the junctions 26–34 compared to junctions 36–44 should remain the same. Under such circumstances, changes in environmental temperature should not affect the output appearing at meter 84.

In operation, the power supply 86 heats the heater cable segment 74 and the segment 74 heats the thermocouple junctions 26–34. Because of the increased temperature of junctions 26–34 relative to junctions 36–44, an increased voltage appears at the volt meter 84. Assuming for example that each of the thermocouple junction pairs produces a voltage of 0.1 volts, the total output appearing on meter 84 would be 0.5 volts. If the probe 12 is inserted into a cooling liquid that covers junctions 32, 34, 42 and 44, the heating effect of the heater cable segment 74 will be negated with respect to junctions 32 and 34. Thus, junctions 32 and 34 would be cooled to a temperature that approximates the temperature of junctions 42 and 44, and the junction pairs 32 and 42, and 34 and 44, will not produce an appreciable voltage. In such case, the voltage appearing on meter 84 will drop to 0.3 volts. If the temperature of the liquid covering junctions 32, 34, 42 and 44 increases or decreases, it should have no appreciable affect on the operation of the probe 12 since the environmental temperatures effecting junctions 32 and 34 are the same as those affecting junctions 42 and 44.

The probe 12 is constructed to provide a continuous electrical output as the liquid level 18 varies and thus continuously measures the liquid level 18 along the probe 12. This continuous output is achieved because of the axial heat flow in the probe 12 along both legs 20 and 22. The spacing between the sensors 26–34 and 36–44 is chosen with reference to the diameters of the legs 20 and 22 (which are normally the same), the power supplied to the heater 74, and the heat transfer properties of the materials used in probe 12. In the preferred embodiment, these factors are adjusted so that the electrical output (voltage) measured at the meter 84 is linear with respect to changes in the liquid level 18. Since the legs 20 and 22 are preferably constructed substantially identically, the compensation provided by leg 22 is also continuous along the length of the leg 22.

Figure 4A:
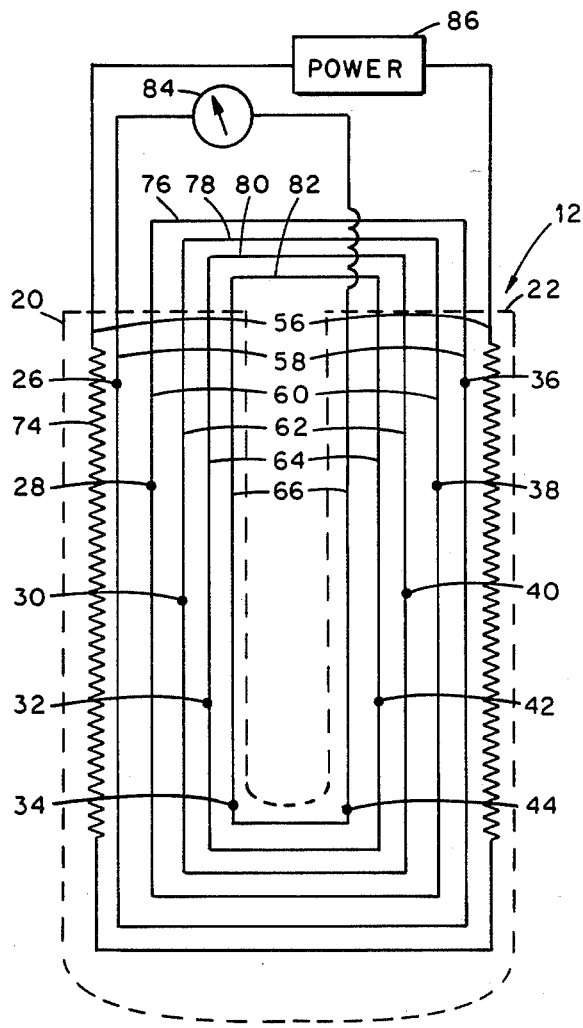

FIG. 4a shows an alternate embodiment in which the heater cable 74 is configured to heat both junctions 26–34 and 36–44. In this configuration the output measured at meter 84 would indicate a liquid level difference between the probe legs 20 and 22 or would indicate that different fluids were present at the two legs. This embodiment would be useful in applications where one leg 20 is placed in a reference environment and the other leg 22 is placed in a liquid to be monitored.

Figure 5:
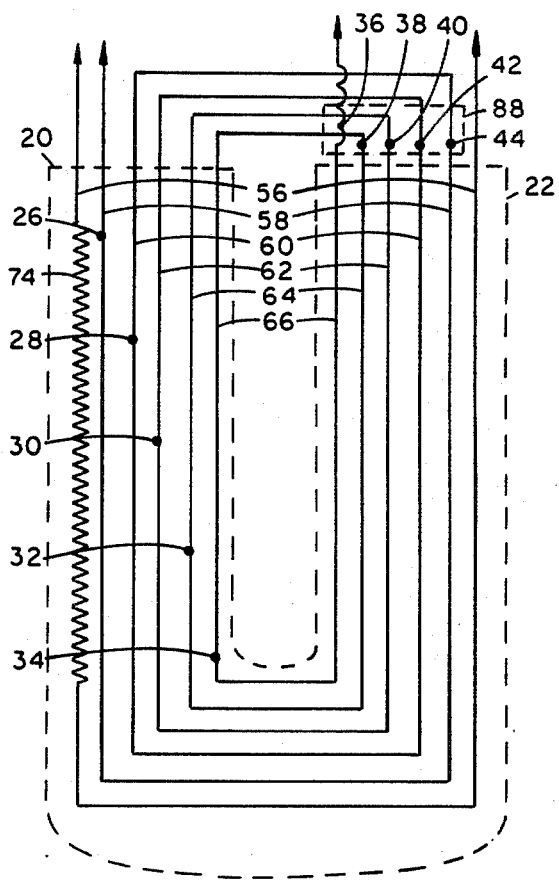
FIG. 5 is a circuit diagram of an embodiment of the instrument in which reference thermocouple junctions are disposed in an isothermal container.

FIG. 5 shows an alternate embodiment of the probe 12 that is identical to the probe 12 shown in FIG. 4 except that the reference thermocouple junctions 36–44 are disposed in an isothermal container 88. In this embodiment, the voltage potential produced by the thermocouple pairs will be dependent upon the environmental temperature and it will not have the inherent temperature compensation of the probe 12 shown in FIG. 4. However, this type of device would be useful for situations requiring knowledge of the absolute temperatures of the environment being sensed.

Figure 6:
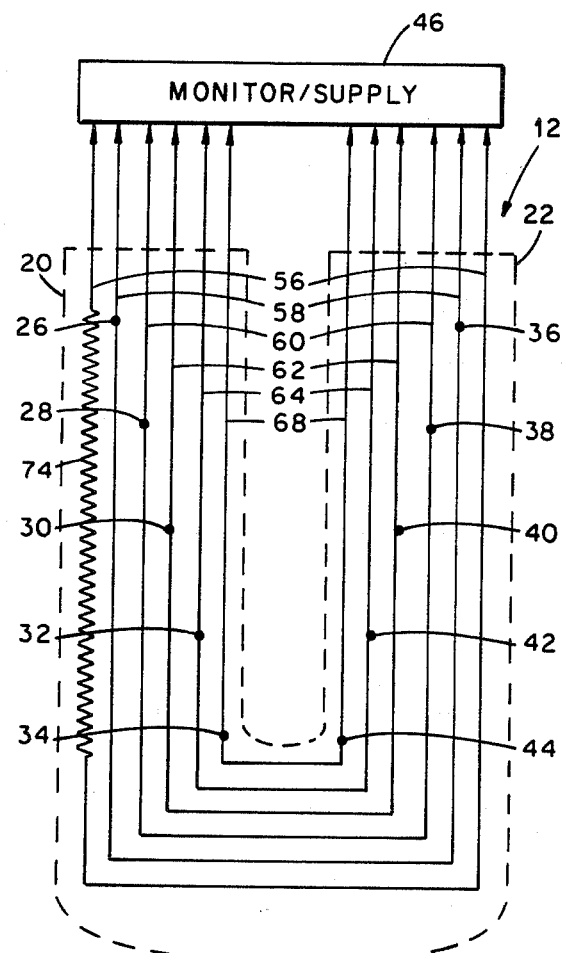
FIG. 6 is a circuit diagram of an instrument embodiment in which each sensor wire is directly connected to a monitor and power supply.

In FIG. 6, the probe 12 is essentially identical to that shown in FIG. 4, except that each of the sensor wires 58, 60, 62, 64 and 66 are connected at both ends to a monitor/supply 46. In this construction, the voltage potentials produced by each sensor wire 58–66 are monitored individually, or internal connections could be made within the monitor/supply 46 to provide the equivalent of the connectors 76–82 shown in FIG. 4. The monitor/supply 46 also provides power to the heater circuit 56 in a manner similar to that shown in FIG. 4.

Figure 7A:
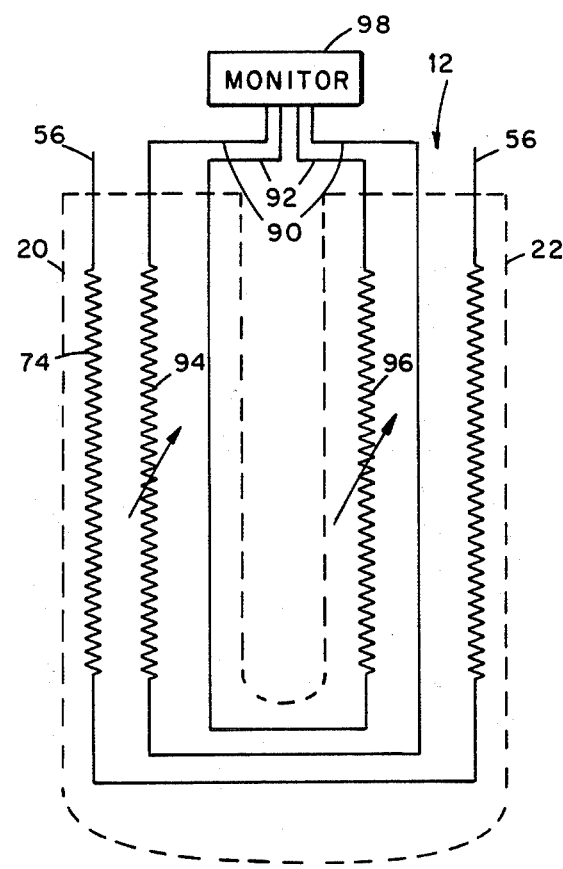
FIGS. 7 and 7a are circuit diagrams of embodiments of the instruments using heat sensitive resistors for sensing heat transfer and providing compensation for environmental temperatures.
Figure 7:
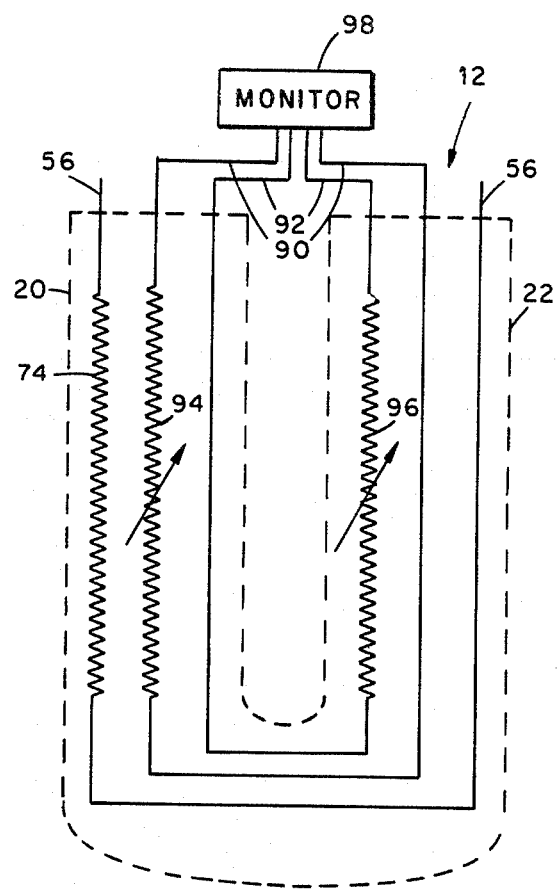

Referring now to FIG. 7, there is shown an alternate embodiment of the present invention that utilizes a pair of sensor wires 90 and 92 which are connected, respectively, to temperature sensitive resistors 94 and 96. The resistor 94 has an elongate configuration and is disposed within the leg 20 for substantially its entire length. Resistor 96 is identical to resistor 94 and is disposed in leg 22 in a position across from resistor 94. Both sensor wires 90 and 92 are connected to a monitor 98 that monitors the resistance across the two sensor wires 90 and 92. In the preferred embodiment, monitor 98 determines the resistance of resistor 94 compared to the resistance of resistor 96. In most applications monitor 98 includes electric circuitry to provide a stable power source to the heater 74, and a wheatstone bridge-amplifier conversion to convert a change in the resistor's value to a comparable voltage change. It can also include analog to digital conversion and a suitable converter for monitoring and/or control of liquid level. However, monitor 98 could be as simple as two ohm meters for individually indicating the resistances of resistors 94 and 96.

Resistor 94 is positioned within leg 20 adjacent to the heater cable segment 74 so that, when the probe 12 is not disposed within a liquid, the heat from segment 74 will increase the temperature of resistor 94 and, consequently, will raise the resistance thereof. When the probe 12 is inserted into a liquid which is cool relative to the heater cable segment 74 and the resistor 94, the liquid will cool that portion of the probe 12 that is within the liquid. Consequently, that portion of the resistor 94 that is within the liquid will also be cooled and the resistance of resistor 94 will decrease. This decrease in resistance will be detected by the monitor 98 and will indicate the level of the liquid.

If the ambient temperatures are known and the temperature of the liquid is known, the monitor 98 may be calibrated so that the liquid level may be determined with reference only to leg 20 of the probe 12. That is, a curve can be developed under those controlled circumstances so that the resistance of resistor 94 corresponds precisely to a level of the liquid relative to the probe 12. However, in most circumstances, there will be changes in environmental temperatures around the probe 12. The temperature of the liquid may change and the ambient temperature of the gases above the liquid may also change. Under these circumstances, it is best to use the resistance of resistor 94 as compared to the resistance of resistor 96 in order to determine the liquid level. Resistor 96 is disposed in leg 22 of the probe 12 and is not heated by the heater cable segment 74. Since leg 20 and leg 22 are disposed in a parallel, side-by-side relationship and since the resistor 96 is disposed perpendicularly across from resistor 94, the environmental effects on resistor 96 are identical to the environmental effects on resistor 94. If the environmental temperatures go up, the resistance of resistors 94 and 96 will go up proportionally. The function of resistor 96 is to provide an environmental temperature reference or environmental temperature compensation for the probe 12. In the preferred embodiment, both resistors 94 and 96 are wires constructed of nickel or nickel-iron alloys and having a diameter of about 0.005 to 0.006 inches.

In FIG. 7a, there is shown an alternate embodiment similar in concept to the embodiment of FIG. 4a in which the heater cable 74 is configured to heat both resistors 94 and 96. In this embodiment different liquid levels or different fluids appearing at legs 20 and 22 would create a voltage output that would be detected by monitor 98.

Having thus described several embodiments of the invention, it will be appreciated that an efficient probe construction and related circuitry provide an accurate relatively inexpensive instrument for measuring liquid levels or other conditions such as gas or liquid flow. In particular, the U-shaped probe provides for accurate temperature compensation and simplified construction. Although particular embodiments of the invention have been described in the foregoing Detailed Description, it will be understood that the invention is capable of numerous rearrangements, modifications and substitutions of parts without departing form the scope of the invention as defined by the appended claims.

I claim:

1. A measuring instrument that senses heat transfer along a probe that is inserted at least partially into an environment, the heat transfer occurring between the probe and the environment, comprising:
   a main probe unit having first and second legs disposed in a side-by-side spaced apart substantially parallel relationship;
   a heater circuit having a heater segment for heating at least said first leg of said main probe unit and being disposed in an orientation extending along said first leg;
   heated sensor means disposed in sid first leg in positions proximate to said heater segment for being heated by said heater segment and for sensing temperatures at a plurality of positions along said first leg;
   second sensor means disposed in said second leg in a position for sensing temeratures at a plurality of positions along said second leg; and
   circuit means connected to said heated sensor means and said second sensor means for producing an output signal proportional to the temperatures sensed by said heated sensor means and said second sensor means whereby the output signal is proportional to the heat transfer measured along the probe and is an indication of environmental conditions.

2. The instrument of claim 1 wherein said main probe unit comprises a tube configured into a U-shape having first and second parallel upright sections and having a transverse section connecting one end of said first upright section with one end of said second upright section, said first and second parallel upright sections forming said first and second legs.

3. The instrument of claim 1 wherein:
   said heated sensor means comprise a plurality of sensors disposed in spaced intervals along said first leg for sensing temperatures of said first leg;
   said second sensor means comprise a plurality of non-heated temperature sensors disposed in said second leg at positions corresponding to the heated temperature sensors in said first leg, a corresponding one of said non-heated temperature sensors being positioned across from each one of said heated temperature sensors in a line perpendicular to said first and second legs; and
   said circuit means being connected to said heated sensors and non-heated sensors to produce the output signal proportional to the temperature of said heated sensors relative to the temperature of said non-heated sensors to provide environmental temperature compensation, whereby changes in the temperature of the environment proximate to the probe will not affect the output signal produced by said circuit means.

4. The instrument of claim 1 further comprising:
   an isothermal container;
   said second sensor means being disposed in said isothermal container; and said circuit means being connected to said heated sensor means and said non-heated sensor means for producing the output signal corresponding to the temperatures of said heated sensor means relative to said non-heated sensor means.

5. The instrument of claim 1 wherein:
said heated sensor means comprise an elongate heated resistor disposed in said first leg and having a resistance that varies with the temperature of said heated resistor;
said second sensor means comprise an elongate non-heated resistor having a resistance that varies with the temperature of said non-heated resistor, said non-heated resistor being positioned in said second leg perpendicularly across from said heated resistor in said first leg; and
said circuit means further comprises means for producing the output signal that is proportional to the resistance of said heated resistor relative to said non-heated resistor.

6. The instrument of claim 1 wherein:
said heated sensor means comprise at least first and second heated thermocouple junctions disposed at different positions along the length of said first leg;
said second sensor means comprise at least first and second non-heated thermocouple junctions disposed along the length of said second leg in positions across from said first and second heated thermocouple junctions, respectively, in a direction substantially perpendicular to said legs; and
said circuit means further comprises means connected to said heated and non-heated thermocouple junctions for producing the output signal proportional to the temperature of said first and second heated junctions relative to the temperature of said first and second non-heated junctions, respectively.

7. The instrument of claim 1 wherein said heater circuit is disposed in and heats said first and second legs, said heated sensor means and said second sensor means.

8. The instrument of claim 1 wherein said heater circuit is disposed in and heats said first and second legs, said heated sensor means and said second sensor means and wherein said heated sensor means and said second sensor means each comprise at least first and second thermocouple junctions.

9. The instrument of claim 1 wherein said heater circuit is disposed in and heats said first and second legs, said heated sensor means and said second sensor means and wherein said heated sensor means and said second sensor means each comprise an elongate resistor whose resistance varies with temperature.

10. A measuring instrument that senses heat transfer along a probe that is inserted at least partially into an environment, the heat transfer occurring between the probe and the environment, comprising:
a metallic tubular sheath having a U-shape with two parallel side-by-side upright spaced apart legs, said legs having top ends and bottom ends, and a lower transverse connecting segment connecting the bottom ends of said legs;
a heater circuit having a heater cable segment disposed in and along the length of said first leg;
an electrical insulator disposed inside said sheath, having an elongate heater passageway disposed at least in said first leg for receiving said heater circuit and having a plurality of elongate sensor passageways extending through said first leg, said connecting segment and said second leg;
a first sensor wire extending through said one of said sensor passageways from the top end of said first leg to the top end of said second leg, said first sensor wire having a heated thermocouple junction disposed in said first leg and a non-heated thermocouple junction disposed in said second leg at a position perpendicularly across from the heated thermocouple junction, a voltage potential being produced across said first sensor wire that is proportional to the temperature of said heated thermocouple junction relative to the temperature of said non-heated thermocouple junction;
at least a second sensor wire extending through one of said sensor passageways from the top end of said first leg to the top end of said second leg, said sensor wire having a heated thermocouple junction disposed in said first leg at a position along said first leg different from the position of said heated thermocouple junction of said first sensor wire and having a non-heated thermocouple junction disposed in said second leg perpendicularly across from said heated thermocouple junction of said second sensor wire, a voltage potential being produced across said second sensor wire that is proportional to the temperature of said heated thermocouple junction of said second sensor wire relative to the temperature of said non-heated thermocouple junction thereof; and
circuit means connected to said first and second sensor wires for producing an output signal indicating the voltage potentials produced by said first and second sensor wires.

11. The instrument of claim 10 wherein said circuit means further comprises:
an electrical connection extending between the top ends of said first and second legs connecting said first sensor wire in said second leg to said second sensor wire in said first leg to connect said first and second sensor wires in series; and
voltage meter means connected to the sense the voltage potential across the series connection of said first and second sensor wires.

12. A measuring instrument that senses heat transfer along a probe inserted at least partially into a liquid in a vessel to measure to the level of the liquid, comprising:
a metallic tubular sheath having a U-shape with two parallel side-by-side upright spaced apart legs for being disposed vertically in a vessel, said legs having top ends and bottom ends, and a lower transverse connecting segment connecting the bottom ends of said legs;
a heater circuit having a heater cable segment disposed in and along the length of at least said first leg;
an electrical insulator disposed inside said sheath, having an elongate heater passageway disposed at least in said first leg for receiving said heater circuit and having a plurality of elongate sensor passageways extending through said first leg, said connecting segment and said second leg;
a first sensing wire extending through one of said sensor passageways from the top end of said first leg to the top end of said second leg, said first sensor wire including a first elongate resistor extending along at least a portion of the length of said first leg and having a resistance that varies with the temperature of said first elongate resistor for sensing liquid levels at a plurality of positions vrtically along said first leg;

a second sensor wire extending through one of said sensor passageways from the top end of said first leg to the top end of said second leg, said second sensor wire including a second elongate resistor extending along at least a portion of the length of said second leg and having a resistance that varies with the temperature of said second elongate resistor for sensing ambient temperatures at a plurality of positions vertically along said second leg; and circuit means connected to said first and second elongate sensor wires for producing at least one output signal indicating the resistances of said first and second sensor wires.

13. The instrument of claim 12 wherein said circuit means is connected to said first and second sensor wires to produce the output signal proportional to the resistance of said first sensor wire relative to the resistance of said second sensor wire.

14. The instrument of claim 12 wherein said first and second elongate resistors are of equal length and said second elongate resistor is disposed perpendicularly across from said first elongate resistor.

15. The instrument of claim 12 wherein said circuit means produces the output signal corresponding to the difference between the resistance of said first sensor wire and the resistance of the said sensor wire.

* * * * *